(12) United States Patent
Lohtia et al.

(10) Patent No.: US 6,560,456 B1
(45) Date of Patent: May 6, 2003

(54) SYSTEM AND METHOD FOR PROVIDING SUBSCRIBER-INITIATED INFORMATION OVER THE SHORT MESSAGE SERVICE (SMS) OR A MICROBROWSER

(75) Inventors: Sunit Lohtia, Redmond, WA (US); Wilfred Martin James, Issaquah, WA (US); Boon Chong Hwang, Bellevue, WA (US)

(73) Assignee: OpenWave Systems, Inc., Redwood City, CA (US)

( * ) Notice: Subject to any disclaimer, the term of this patent is extended or adjusted under 35 U.S.C. 154(b) by 0 days.

(21) Appl. No.: 09/344,407

(22) Filed: Jun. 24, 1999

Related U.S. Application Data

(63) Continuation-in-part of application No. 09/317,476, filed on May 24, 1999, now abandoned.

(51) Int. Cl.[7] ................................................. H04Q 7/00
(52) U.S. Cl. ........................ 455/445; 455/422; 455/466
(58) Field of Search ................................. 455/422, 433, 455/435, 466, 445, 566, 569, 575, 414; 709/218, 216, 217, 219

(56) References Cited

U.S. PATENT DOCUMENTS 5,978,672 A   11/1999  Hartmaier et al.
6,078,820 A    6/2000  Wells et al.
6,181,935 B1   1/2001  Gossman et al.
6,317,594 B1  11/2001  Gossman et al.

FOREIGN PATENT DOCUMENTS

| EP | 0851696 | 7/1998 | ............ H04Q/7/22 |
| WO | WO 98/11744 | 3/1998 | ............ H04Q/7/22 |
| WO | WO 98/34422 | 8/1998 | ............ H04Q/7/00 |
| WO | WO 98/51097 | 11/1998 | |
| WO | WO 01/20921 A1 | 3/2001 | |

Primary Examiner—Thanh Cong Le
(74) Attorney, Agent, or Firm—Fulbright & Jaworski L.L.P.

(57) ABSTRACT

The present invention discloses a system and a method for providing information to a communication device in response to a request for such service received from the communication device. The request may be in the form of a digits request trigger or short message service (SMS) origination message that is initiate from a wireless telephone. The digits request trigger and SMS origination request may be initiated when a user selects a menu option or it may be initiated using a microbrowser. The digits request trigger or SMS origination message is sent from the communication device to a wireless web information services gateway. The gateway retrieves the requested information from one or more sources. The gateway then forwards the retrieved information to the user via an SMS message or via a microbrowser message. The information may be formatted according to a preselected configuration that is stored in a user service information profile.

14 Claims, 3 Drawing Sheets

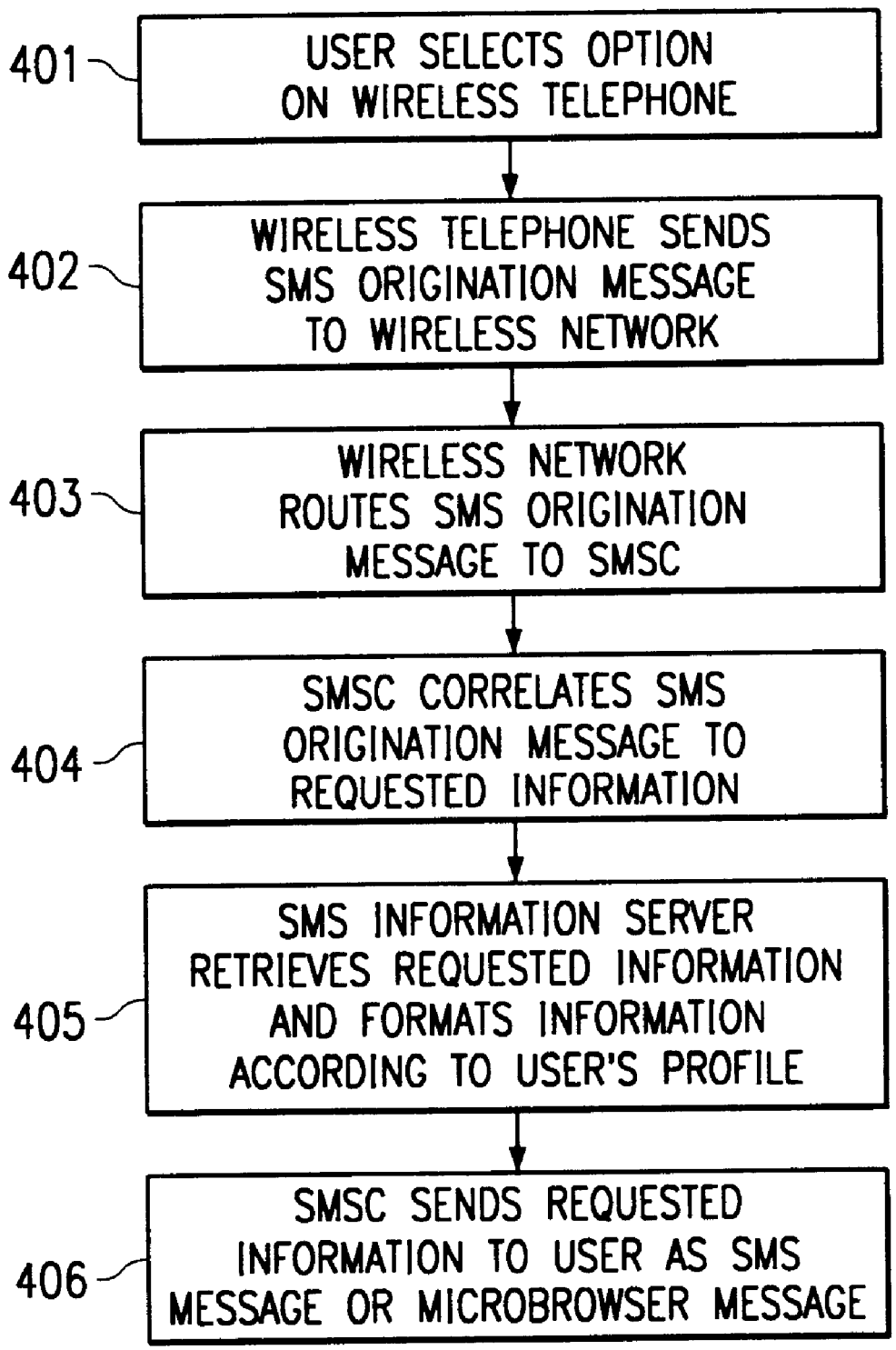

US 6,560,456 B1

SYSTEM AND METHOD FOR PROVIDING SUBSCRIBER-INITIATED INFORMATION OVER THE SHORT MESSAGE SERVICE (SMS) OR A MICROBROWSER

RELATED APPLICATIONS

This application is a continuation-in-part of commonly assigned and U.S. application Ser. No. 09/317,476, entitled SYSTEM AND METHOD FOR PROVIDING SUBSCRIBER-INITIATED INFORMATION OVER THE SHORT MESSAGE SERVICE (SMS) OR VIA A MICROBROWSER, filed May 24, 1999, now abandoned, which is incorporated herein by reference.

TECHNICAL FIELD

This application relates generally to wireless data information services, and more specifically to a system and method for allowing users to obtain specific data information over the Short Message Service (SMS) by dialing predetermined telephone number digits, feature code digits, or by an SMS origination message.

BACKGROUND

The Short Message Service (SMS) allows wireless subscribers and service providers to send alphanumeric messages of limited length. Subscribers may send or receive email messages via SMS. The wireless network may route email and other text messages to subscribers via the SMS. The SMS messages may contain preselected information, such as stock quotations or weather forecasts. In the prior art, SMS messages comprising preselected information are sent at predetermined intervals, such as at a certain time of day or when certain events occur. However, wireless network operators do not provide a mechanism that allows subscribers to trigger the receipt of such SMS messages. Accordingly, there is a need to provide wireless subscribers with the capability to request particular types of SMS messages at any time. It is a feature of one embodiment of the present invention to provide this enhanced network capability without requiring an update or modification to the existing Mobile Switching Center (MSC) software.

SUMMARY OF THE INVENTION

These and other objects, features and technical advantages are achieved by a system and method which provides the use of a trigger to cause SMS or microbrowser messages to be sent to a wireless telephone or other device. The trigger may be a dialed telephone number, feature code, other dialed digits, or SMS origination message.

The invention disclosed herein allows a wireless user to obtain data information from the Internet, World Wide Web (WWW) or other information source over the SMS or via a microbrowser in the phone. Users dial a predetermined service feature code, service ID, or telephone number on their wireless handset. The feature code or telephone number is routed to a Distributed Wireless Web Information Service Gateway (WWIS Gateway), which determines what information is being requested by the user and then collects that information from the appropriate source. The WWIS Gateway formats the information and sends it to the users' handsets via the SMS or microbrowser message. As a result, wireless carriers can provide users with the capability to originate inbound SMS or microbrowser messages that are directed to the user's handset. By using a valid telephone number, wireless carriers can provide this capability without modification of the Mobile Switching Center (MSC), Home Location Register (HLR) or Service Control Point (SCP) software.

However, feature codes or SMS origination messages can also be used to trigger the SMS or microbrowser information service if the MSC, HLR and/or SCP translation tables and software either already provide or are modified to provide such functionality. The wireless network treats the dialed digits, feature code, or SMS origination as a trigger and sends a service or origination request, such as a Web Information Service Request message, to a Distributed WWIS Gateway. The Distributed WWIS Gateway integrates wireless access with the Internet, Intranets, Extranets, the World Wide Web and other sources of information. In one embodiment, a feature code or dialed digits may be treated as an IS-41 trigger by the wireless network. The IS-41 trigger causes information to be sent to the wireless telephone via an SMS or microbrowser message. In other embodiments of the invention, an SMS origination message may act as a trigger to cause information to be sent to the wireless device via the SMS or microbrowser messages.

The Distributed WWIS gateway is able to handle call and data processing messages that are based upon any protocol. User information is stored on a Distributed WWIS Gateway database as service information subscriber profiles. The Distributed WWIS gateway is capable of accessing any information servers and/or web servers via the Internet or other connections using any applicable or required protocols. The Distributed WWIS gateway is also capable of sending the SMS or microbrowser messages comprising the requested information to the wireless carrier's SMS server, microbrowser server or electronic mail server. The SMS, microbrowser server or electronic mail server then forwards the SMS or microbrowser messages to the user via the wireless network.

The present invention allows subscribers to define a set of preferences in an service information profile. Preferably, users access a web site or other computer network site to configure individual profiles. Users can select services such as stock quotations, location information, daily schedule, movie theatre or entertainment preferences, etc. Once the user profile is set, the invention provides the requested information via SMS or microbrowser as and when requested by the user. The user request is made by dialing the service request feature code, telephone number, or by invoking a SMS origination request. The service feature codes and SMS origination service message are preprogrammed in the user service profile at the WWIS web site. Alternatively, the user may preselect certain times or intervals for the information to be sent via SMS or microbrowser. Although the SMS or microbrowser information is triggered by sending dialed digits, a voice connection may not be completed for the call. Instead, the user receives an indication that the number is not available or that the information is being processed.

The Distributed WWIS Gateway that provide the SMS information service is a distributed computing server that can accept information service requests from HLRs, SCPs, MSCs, SMSCs, or microbrowser servers. The gateway authenticates the subscriber and gathers the requested information from databases and other providers via the Internet or from a local Distributed WWIS information database. The information is then formatted and sent to the subscriber through the wireless carrier's SMS or microbrowser server.

The Distributed WWIS gateway consists of the following distributed wireless web gateway applications: information services, database services, SS7 message application, short message and email application, or microbrowser service application, system management, network management, profile management, device management, service management, interactive session management, queuing and messaging application, data markup language text application, webcast application, on-demand triggering application, billing application, authentication application, web server application, directory service application, affinity group service application, e-commerce application, advertising application, etc.

Accordingly, it is an object of the present invention to provide a system and method to receive requested information via SMS or microbrowser message using dialed digits or SMS origination as the trigger. Subscribers initiate the trigger by entering a preselected feature code, telephone number or SMS origination message on their handsets. The trigger may be in the form of an origination request, service request message, initial DP message, SMS origination request or microbrowser data request sent by the wireless network.

It is a further object of the present invention to provide a Distributed WWIS Gateway capable of querying a plurality of local or remote databases to obtain information pertinent to a wireless user's request. The Distributed WWIS Gateway may receive SMS triggers, origination request messages, service request messages, initial DP request messages or SMS origination requests from the MSC, HLR, SCP, or SMSC of a wireless network via an SS7 or IP network.

It is another object of the present invention to provide a wireless user with personalized information via the SMS or microbrowser in response to a service request, an origination request, an initial DP request or SMS origination made by the wireless user.

An additional feature of the invention provides for reformatting information gathered in response to a subscriber-generated trigger. The reformatted information is adapted for the subscriber's handset display and is routed to the SMS or microbrowser server of the subscriber's wireless carrier. Alternatively, the SMS message is sent to an email gateway at the wireless carrier's location.

It is another feature of the present invention to allow advertisers and others to send SMS messages comprising embedded telephone numbers, feature codes or SMS origination message, wherein a subscriber may automatically respond to the message by pressing "SEND" or "TALK." The subscriber may be connected to a service representative or a recorded message via the embedded number or code. Alternatively, the subscriber may receive additional SMS or microbrowser messages in response to selection of the embedded digits. The user may create a virtual session with the WWIS Gateway where a series of SMS or microbrowser messages may be sent to the handset based on the trigger digits or SMS origination message contained in the SMS or microbrowser messages sent to the user.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 is a flow chart of the steps followed in an alternate embodiment of the invention.

DETAILED DESCRIPTION

The present invention allows wireless users to receive preselected information or services on-demand via SMS or microbrowser messages that are displayed on their wireless telephones. The users may request predefined sets of information or they can request generic information. The wireless subscribers' predefined preferences are maintained on a database as service information profiles. Users may access the database to configure or update the service information profiles. The information and services available to the subscribers include stock quotations, weather information, personal schedules, user location services, movie theatre preferences, or any other information that the user may require. In a preferred embodiment, the users service information profiles and the subscriber information database are accessible to the subscribers via a global, public computer network, such as the Internet or World Wide Web, and/or via a proprietary computer network provided by the wireless network operator. The service information profile database may be accessible to and serve one or more wireless networks. A system and method for creating a wireless user profile is disclosed in pending patent application Ser. No. 08/996,524, entitled SYSTEM AND METHOD FOR CONTROLLING PERSONAL INFORMATION AND INFORMATION DELIVERY TO AND FROM A TELECOMMUNICATIONS DEVICE, filed Dec. 23, 1997, the disclosure of which is hereby incorporated by reference herein. Once the users have configured their service information profiles, the requested information may be provided over the SMS whenever requested by the user.

Figure 1:
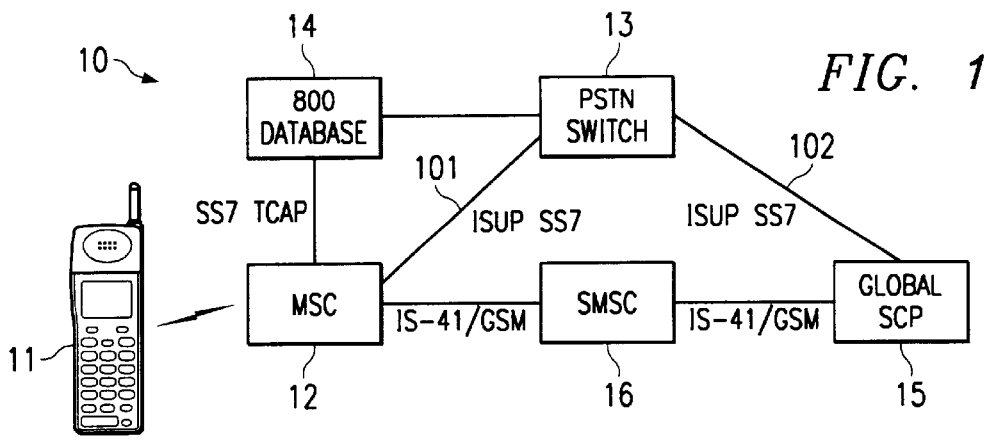
FIG. 1 is a block diagram of a system that employs an exemplary embodiment of the present invention.

FIG. 1 is a block diagram of system 10 illustrating various network elements that are used in an exemplary embodiment of the present invention. Subscribers communicate with system 10 via handset 11, which is capable of sending, receiving and displaying SMS or microbrowser messages. MSC 12 is in communication with handset 11. The handset may use an air interface standard, such as Telecommunications Industry Association (TIA) Interim Standard (IS) 136, the Global System for Mobile Communication (GSM) standard, TIA IS-95 CDMS or any other standard or protocol which supports SMS, microbrowser or text messaging. Other wireless network infrastructure components and equipment, such as base station controllers, base transceiver stations, antennas, Home Location Registers (HLR), and Visitor Location Registers (VLR), that may be connected to MSC 11 are not shown to simplify FIG. 1. The user triggers the on-demand SMS information service by dialing the appropriate predetermined telephone number on handset 11. For example, the user may dial "1-800-WEATHER" (1-800-932-8437) to request weather information. These dialed digits are sent from handset 11 to MSC 12 via the applicable air interface standard.

Upon receipt of the dialed digits, MSC 12 routes the call to Public Switched Telephone Network (PSTN) switch 13 via Integrated Services Digital Network User Part (ISUP) trunk 101 as a normal call. Switch 13 queries 800 Database 14 to obtain the appropriate translation for the "800-WEATHER" (800-932-8437) telephone number. In the present example, the destination number corresponds to Global SCP 15, and Switch 13 routes the call to Global Service Control Point (SCP) 15 via ISUP trunk 102. As part of the call setup information, Global SCP 15 receives both the Called and Calling Party Numbers for the call from handset 11. Since a voice circuit will not be completed for the dialed digits, Global SCP 15 sends a response to Switch 13 indicating that the called number is not available. As a result, the user receives an indication that the call was not completed, such as busy line, busy circuit or out-of-service tones or messages, or a prerecorded message indicating that the requested information is being processed. The subscriber then hangs up and the call ends.

Global SCP 15 uses the Called Party Number or destination number to determine which service has been requested by the user. A called party or destination number corresponding to "800 WEATHER" in this example may indicate that the user is requesting weather information, such as forecasts or observations for either a current location or a preselected location indicated in the user's service information profile. Other called numbers may also be routed to Global SCP, but a different called number will indicate that other information is requested. For example, the digits "1-800-MYSTOCK" (1-800-697-8625) may indicate that the user is requesting stock quotations for a preselected group of stocks as indicated in the users service information profile. Alternatively, the "800-MYSTOCK" (800-697-8625) digits may indicate to Global SCP 15 that the user is requesting generic information, such as the current or closing averages for stocks on the New York Stock Exchange and/or other exchanges or markets. Any telephone number may be used to trigger the sending of a specific type of information via SMS or microbrowser. The number is not limited to "800" numbers and there is no requirement that the number be translated, such as by 800 Database 14, or that the number be assigned to Global SCP 15. The dialed digits or feature code may be treated as a trigger, such as an IS-41 trigger, by the wireless network. The user may initiate an SMS origination message, for example, by selecting a menu option displayed on the wireless telephone or by selecting an option displayed on a microbrowser.

Effectively, the Called Party Number indicates what type of information is to be sent and the Calling Party Number indicates which wireless device 11 is to receive the SMS or microbrowser information. Global SCP 15 obtains the requested information and then sends an SMS or microbrowser message containing the requested information to message center 16 for the wireless network. Alternatively, Global SCP 15 may send the requested information in an email message by using an electronic mail gateway at the wireless carrier's location. The SMS or microbrowser message is then forwarded to wireless handset 11 where the user can read the information on a display.

In another embodiment, the Global SCP may complete the call and ask the user to enter a password or any other information. The Global SCP then asks the user to enter the trigger digits, feature code or SMS origination message. The Global SCP then sends the information to the Distributed WWIS Server. The Distributed WWIS server determines the service requested by the user. The information is then sent to the user via an SMS or microbrowser message.

The embodiment described herein with reference to FIG. 1 allows wireless subscribers to trigger preselected incoming SMS or microbrowser messages without any modifications to the MSC software. Accordingly, wireless service providers and network operators do not have to update MSC software loads to support the Origination Request message in order to provide on-demand SMS or microbrowser messages to subscribers. The trigger used in the present invention may be any telephone number digits, for example, any predetermined number corresponding to the North American Numbering Plan. The call that is initiated by the dialed digits is routed to Global SCP 15 via the PSTN as a normal call, and the reply SMS or microbrowser message is transmitted from Global SCP 15 to handset 11. There is no requirement to modify or adapt MSC 12 or other wireless network components to provide the services described herein.

Global SCP 15 does not have to be part of the wireless providers' network. Wireless users who subscribe to any wireless carrier may use the on-demand SMS or microbrowser messaging described herein. No direct signaling, such as IS-41 signaling, is required between MSC 12 and Global SCP 15, since the outbound call initiation is routed via the normal PSTN connections and the incoming SMS or microbrowser message may be routed via an electronic mail gateway. Accordingly, the present invention can be deployed using the existing wireless and wireline network infrastructure. Moreover, since a valid telephone number is used, the trigger can be dialed from any MSC. Thus, there are no roaming problems and the wireless carriers do not have to modify or update their equipment, such as MSC 12, to communicate with an external SCP, such as Global SCP 15.

In alternative exemplary embodiments, the trigger may be a preselected service feature code, such as "#STOCK" (#78625), "™WEATHER" (™9328437), "#1", "#123", or "#3259". When such service feature codes are received at the MSC from the user's handset, the dialed digits are routed to an SMS or Microbrowser Information Server, such as an SCP as described above or some other processor-based device that has similar capabilities. The SMS or Microbrowser Information Server must be adapted to correlate dialed digits to available information, to retrieve and format requested information and to send the requested information to an entity corresponding to the originator of the dialed digits, such as a wireless network message center. The dialed digits and reply information may be routed via the PSTN, a Signaling System No. 7 (SS7) network, a dedicated circuit, or via any other wireline or wireless telecommunications or data links known now or developed hereafter.

Figure 2:
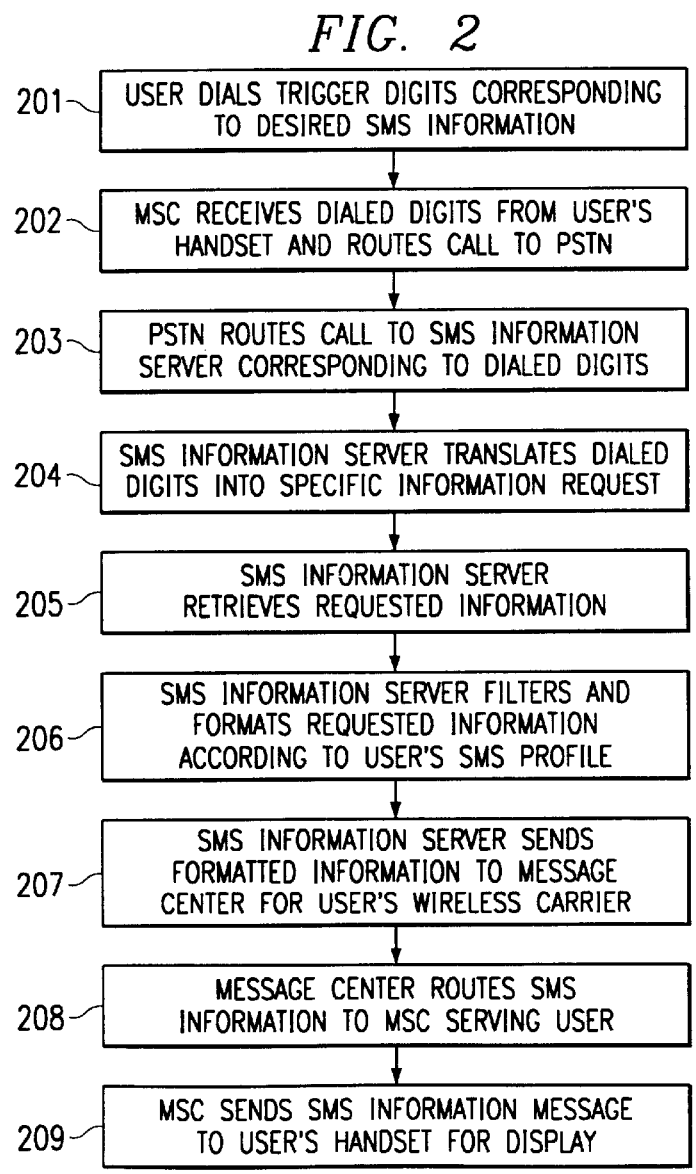
FIG. 2 is a flow chart of the steps that are followed one embodiment of the present invention.

FIG. 2 is a flow chart illustrating the steps that are followed in one embodiment of the present invention. In step 201, the user enters a telephone number or a feature code on his or her handset and send the digits to the serving MSC. The dialed digits correspond to any preselected information that can be returned to the user via an SMS or microbrowser message for display on the user's handset. The MSC receives the trigger digits in step 202 and routes the digits to the PSTN to initiate a call. The digits may be routed via any protocol that is appropriate for the particular network. In step 203, the call is routed via the PSTN to an SMS or Microbrowser Information Server corresponding to the dialed digits.

The SMS or Microbrowser Information Server translates the dialed digits into a specific information request in step 204 and then obtains that information in step 205. The information may be obtained from the user service information database resident at the Microbrowser Information Server or the SMS Information Server may query other databases or servers to obtain the desired information. Once the requested information has been obtained by the SMS Information Server, it is filtered and formatted in step 206 according to the user's customized service information profile and as needed to facilitate transmission as an email, SMS message or microbrowser message. The information is then transmitted to the message center for the user's wireless service provider in step 207. In step 208, the message center routes the requested information to the MSC that is currently serving the user, and the serving MSC routes the SMS or microbrowser message to the user's handset for display in step 209.

Figure 3:
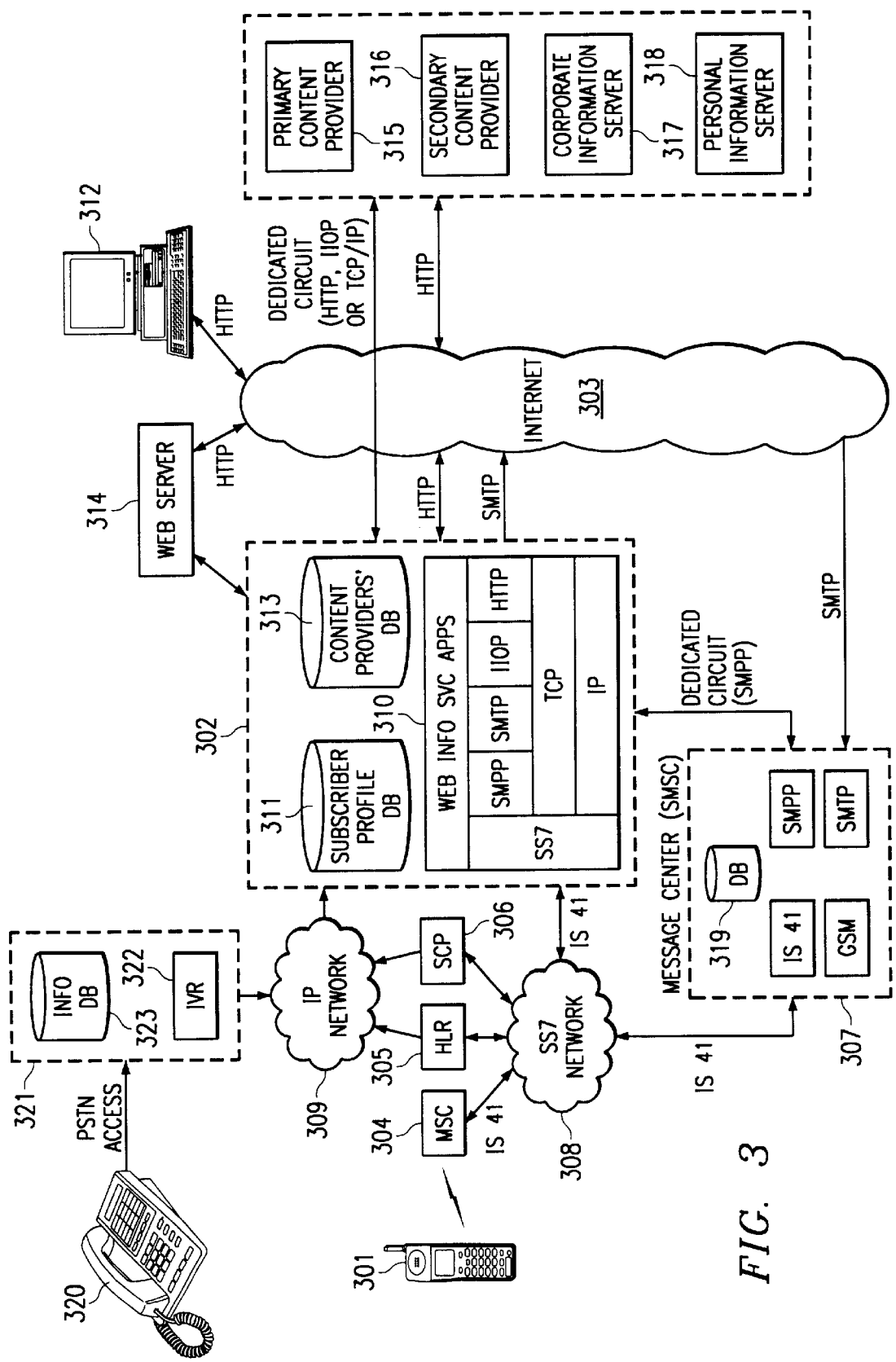
FIG. 3 is a block diagram of an alternative exemplary embodiment of a system capable of performing the present invention.

FIG. 3 is a block diagram of another embodiment of the present invention. A wireless subscriber dials a feature code and receives SMS or microbrowser messages via wireless telephone 301. It will be understood that the references to handset, telephone or device 301 as used herein shall mean any fixed, portable, mobile, wireline or wireless telephone, handset, or other subscriber unit that is capable of transmitting and/or receiving SMS or microbrowser messages. The user can request preselected data or other information from Internet 303, the World Wide Web (WWW) or any other sources via Distributed Wireless Web Information Service Gateway (WWIS Gateway) 302. Using wireless handset 301, a user enters a preselected service feature code, an SMS or microbrowser Information telephone number or any other appropriate code or digits corresponding to a particular information request. The code or digits, such as #STOCK, # WEATHER, "#1", "#123", or "#3259" which may be preprogrammed in the user service profile at the WWIS web site, are transmitted to serving MSC 304, which routes the user's request to WWIS Gateway 302. Again, for simplification purposes, other components of the wireless network, such as base stations, are not shown in the figure. Upon receipt of the information request, Distributed WWIS Gateway 302 obtains the desired information and sends the information to the user at handset 301 via an SMS or microbrowser message.

The wireless service provider's network may be comprised of a number of components, including MSC 301, HLR 305, SCP 306, Microbrowser Server 311 and SMS Message Center 307. These components may be linked together via an SS7 network 308 and communicate via a protocol, such as by messages complying with the IS-41 or GSM standard. Alternatively, one or more of the various components may be part of remote networks or other service providers' networks, and they may communicate via other well known telecommunications or data communication methods, including SS7 networks or other links in the PSTN. The service provider's wireless network communicates with WWIS Gateway 302 via SS7 network 308 or other networks, such as IP network 309. Networks 308 or 309 may be used to route the user's request to Distributed WWIS Gateway 302.

Current and future wireless networks may provide the SMS or microbrowser information service described herein by modifying the translation tables on MSC 304, HLR 305 or SCP 306 so that the dialed digits or feature code act as a trigger to send a service, origination, initial DP message, such as a Web Information Service Request message, to Distributed WWIS Gateway 302. This trigger eventually causes the user to receive an SMS or microbrowser Information message at handset 301. Preferably, Distributed WWIS Gateway 302 is able to handle any call processing messages, such as Wireless Intelligent Network (WIN) Mobile Application Part (MAP) and GSM CAMEL Application Part (CAP) messages. A call connection is usually not completed after the user sends the dialed digits or feature code. Instead, the user may receive an indication that the called number is unavailable, that the requested information is being processed or some other message. The user may end the call after receiving such an indication. Alternatively, the wireless network may terminate the connection upon a determination that an SMS or microbrowser information request has been sent by the user.

Distributed WWIS Gateway 302 is capable of communicating using any available protocol. Service applications 310 provide protocols so that Distributed WWIS Gateway 302 may communicate via an SS7 or IP network. Additionally, Distributed WWIS Gateway 302 is capable of handling one or more of the following protocols: Internet Inter-Object Request Broker Protocol (IIOP), Transmission Control Protocol/Internet Protocol (TCP/IP), Short Message Peer to Peer Protocol (SMPP), Simple Mail Transfer Protocol (SMTP), Hyper Text Transfer Protocol (HTTP), Wireless Application Protocol (WAP) and/or any data transfer protocol that allows information to be exchanged among two or more devices.

Distributed WWIS Gateway 302 is a computing server that accepts information service activation from wireless network components, such as MSC 302, HLR 305 or SCP 306. Upon receiving the SMS or microbrowser information request, Distributed WWIS Gateway 302 authenticates the subscriber and correlates the dialed digits, feature code or SMS origination request to a specific information request using Subscriber Profile Database 311. The service message or origination request message from the wireless network includes an identification of the calling party, such as the Mobile Identification Number (MIN) or Calling Party Number for handset 301. Distributed WWIS Gateway 302 correlates this identity information to a particular user file in database 311.

Each subscriber has a Service Information Profile on database 311 that indicates the user's preselected or customized service information services. Users access, customize and modify their personal service information database files via computers 312, which may be linked to Distributed WWIS Gateway 302 either directly or through Internet 303. Preferably, subscribers access and configure their records on database 311 via a graphical interface, such as a WWW site. Such an access method is disclosed in the above referenced pending application Ser. No. 08/996,524. Subscribers can select a virtually limitless range of information to be transmitted on-demand to handset 301 via SMS or microbrowser messages. In one embodiment, users may configure the system so that selected information is sent to handset 301 at predetermined periods. Alternatively, the information may be correlated to a predetermined feature code, telephone number or SMS origination service message. These feature codes, telephone numbers and SMS origination service messages may be specific to a particular user or they may relate to a generic subject and may be available to all users. For example, a feature code such as #STOCK may prompt Distributed WWIS Gateway 302 to send an SMS or microbrowser message comprising quotations for the user's personal stock portofolio, or Distributed WWIS Gateway 302 may send an SMS or microbrowser message comprising general market information and statistics based upon generic indices. The order and arrangement of the SMS or microbrowser messages are also selectable by the user. The subscriber service information profiles may be stored on another device, such as Web Server 314, that is accessible by Distributed WWIS Gateway 302.

Once Distributed WWIS Gateway 302 determines what information is required, it obtains the requested information. Distributed WWIS Gateway 302 may gather certain often-requested information, such as stock quotations or weather information, at regular intervals. This and other information may be stored at Distributed WWIS Gateway 302 on Content Providers' Database 313. In addition to storing information to be sent to users, database 313 may comprise information indicating where and how to find or obtain other data, such as addresses for third party web sites or databases and the appropriate search or information retrieval instructions. Distributed WWIS Gateway 302 may access information sources, including Web Server 314 and Content Providers 315–318, either directly via a dedicated circuit or indirectly, for example, via Internet 303. Content Providers 315–318 may include any private or public database or source of current or historical information, including Intranets, Extranets, WWW sites, File Transfer Protocol (FTP) servers, and the like.

The information gathered by Distributed WWIS Gateway 302 in response to the user's request is formatted as required by the user's profile in database 311 and then sent to the user as an SMS or microbrowser message. The SMS message is first routed to SMS message center (SMSC) 307. The link between Distributed WWIS Gateway 302 and SMSC 307 may be a dedicated connection, such as an SMPP over TCP/IP circuit. Alternatively, SMS messages may be routed from Distributed WWIS Gateway 302 to SMSC 307 indirectly via SMTP over Internet 303. SMSC 307 interacts with the wireless network to determine which MSC 304 is currently serving handset 301. The SMS message is then routed to serving MSC 304 using the appropriate protocol for delivery to handset 301 over the air interface. Routing from SMSC 307 to MSC 304 may be within a single wireless network or among two or more networks. The SMS information service describe herein is available without roaming limitations. If the handset goes out-of-service or temporarily loses contact with MSC 304, or if HLR 305 is unable to provide the appropriate information for wireless telephone 301, then SMSC 307 may store the SMS message in database 319 until routing information for device 301 is available. Any network protocols currently existing or later developed may be used to communicate SMS messages among Distributed WWIS Gateway 302, SMSC 307, MSC 304 and handset 301, without departing from the scope of the present invention.

In case of microbrowser messages, the Distributed WWIS Gateway sends the microbrowser message to the microbrowser server. The microbrowser message is then directed to the mobile station via over SMS data channel or other mechanism.

In another embodiment, the SMS or microbrowser messages may be triggered from a non-wireless device, such as from wireline telephone 320. Pending patent application Ser. No. 08/720,089, entitled MOBILITY EXTENDED TELEPHONE APPLICATION PROGRAMMING INTERFACE AND METHOD OF USE, filed Sep. 27, 1996, issued as U.S. Pat. No. 5,978,672, on Nov. 2, 1999 and application Ser. No. 08/852,951, having the same title and filed May 8, 1997, issued as U.S. Pat. No. 6,181,935 B1, on Jan. 30, 2001 the disclosures of which are hereby incorporated by reference herein, disclose systems in which a wireline network may function as an extension of a WIN wireless network. Wireline network 321, which may be a Public Branch Exchange (PBX) or other private network, comprising Interactive Voice Response (IVR) system 322 and database 323 for example, is coupled to Distributed WWIS Gateway 302 via IP network 309. Alternatively, wireline network 321 may be coupled as an extension of a wireless network (not shown).

In this exemplary system, a subscriber may activate the SMS information service from telephone 320 by entering an appropriate feature code or dialed digits. Wireline network 321 converts the dialed digits to a service or origination request trigger and routes the trigger message to Distributed WWIS Gateway 302. Upon receipt of the wireline-initiated SMS trigger, Distributed WWIS Gateway 302 uses information from database 302 to identify the subscriber, to determine the requested information and to determine which wireless device is to receive the SMS or microbrowser information message. Such a system allows subscribers to use wireline telephone 320 to trigger an SMS or microbrowser information message that is directed to handset 301. Wireless telephone 301 may be the subscribers own SMS- or microbrowser capable device 301, or wireless handset 301 may belong to someone else, such as a co-worker or family member. In a similar fashion, a subscriber may use a first wireless telephone 301 to initiate an SMS or microbrowser message that is to be delivered to a second wireless device (not shown). Accordingly, the present invention allows subscribers to trigger the sending of SMS or microbrowser messages comprising preselected information to either the subscriber's own telephone or another telephone.

Another embodiment of the present invention provides enhanced advertising services to users. Advertisers can send SMS or microbrowser messages to targeted customers. These customers can be selected individuals or any subscribers that are active in a geographic area defined by one or more cells or cell sectors in the wireless network. The advertising message may contain a telephone number or feature code for the subscriber to call to complete a transaction or for more information about advertised products or services. The subscriber, after reading the SMS or microbrowser advertising message, need only press "TALK" or "SEND," and the wireless device will automatically dial the embedded telephone number or feature code. Consequently, advertisers may provide subscribers with the ability to reply to specific SMS advertising messages. It will be understood that this functionality is not limited to advertising, but that other entities may send SMS or microbrowser messages comprising embedded telephone numbers or feature codes.

Upon selection of the embedded telephone number or feature code, for example by pressing "SEND," the user may be connected by a voice circuit to a recorded message or to a service representative, whereby the subscriber can obtain or provide further information or complete a transaction. Alternatively, selection of the embedded telephone number or feature code may function as an SMS or microbrowser message trigger so that additional SMS or microbrowser messages are transmitted to and displayed on the user's wireless handset in the manner describe above. Accordingly, subscribers would have the options of either ignoring the advertisements and messages or prompting additional information or messages to be sent via SMS.

FIG. 4 is a flowchart illustrating exemplary steps followed in an alternate embodiment of the invention. In step 401, the user initiates an SMS origination message by selecting an option on a wireless telephone. The option may include a menu option or an option displayed on a microbrowser. The wireless telephone transmits the SMS origination message to the wireless network in step 402 and the message is routed to a wireless web information services gateway or SMSC in step 403. Although the present exemplary embodiment of the invention is described in terms of an SMS origination message, it will be understood that any origination message or trigger can serve the same function. The gateway or SMSC correlates the SMS origination message with other information to determine what the user has requested in step 404. The requested information is retrieved, for example by an SMS information server, in step 405 and then formatted as previously configured by the user. The user's preferred configuration for certain types of information may be stored in the service information profile disclosed above. Finally, the requested information is sent to the user as an SMS message or a microbrowser message in step 406. The information is then displayed to the user as a received SMS message or on a microbrowser.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for providing information to users via communications devices associated with said users, comprising:
   receiving an information origination message from said communication devices, wherein said information origination message comprises dialed digits;
   retrieving information corresponding to said information origination message; and
   sending said retrieved information via a Short Message Service (SMS) message to said communication devices for display to said users.

2. The method of claim 1, wherein said information origination messages are initiated when said users select a menu option on said communication devices.

3. The method of claim 1, wherein said information origination messages are initiated by said users from a microbrowser on said communication devices.

4. The method of claim 1, wherein said communication devices are wireless telephones.

5. The method of claim 1, wherein said retrieving step further comprises the steps of:
   identifying users associated with said information origination messages;
   correlating said information origination messages with specific information requests for said users; and
   retrieving said specific information.

6. The method of claim 1 wherein said information origination message comprises dialed digits sent from said communications device.

7. The method of claim 1 wherein said information origination message comprises a feature code entered on said communications device.

8. A system for providing information to a wireless network subscriber in response to an information origination message, wherein said information origination message comprises dialed digits, the system comprising:
   means for receiving said information origination message from said wireless network;
   means for retrieving data corresponding to said information origination message; and
   means for sending said retrieved data to a user who initiated said information origination message via a Short Message Service (SMS) message.

9. The system of claim 8 further comprising:
   means for correlating said information origination message to requested data.

10. The system of claim 9 wherein said correlating means accesses a user profile database to identify said requested information for a particular information origination message.

11. A short message service information system for a wireless network comprising:
   a short message service (SMS) center coupled to said wireless network and capable of receiving messages from said wireless network;
   means for correlating information request messages to requested information, wherein said information request messages comprise dialed digits;
   means for retrieving said requested information; and
   means for sending said requested information to subscribers via an SMS message.

12. A computer program product having a computer readable medium with computer program logic recorded thereon for use in a system for providing requested information to wireless network subscribers, said computer program product comprising:
   means for correlating an information request message to requested data, wherein said information request message comprises dialed digits;
   means for retrieving said requested data;
   means for formatting said requested data according to a user profile; and
   means for transmitting said data to said subscriber via a Short Message Service (SMS) message.

13. A short message service information system for a wireless network comprising:
   a wireless web information services gateway coupled to said wireless network and capable of receiving feature code messages from said wireless network;
   means for correlating said feature code to requested information;
   means for retrieving said requested information; and
   means for sending said requested information to subscribers on said wireless network via a Short Message Service (SMS) message.

14. A computer program product having a computer readable medium with computer program logic recorded thereon for use in a system for providing requested information to wireless network subscribers, said computer program product comprising:
   means for correlating an IS-41 trigger to requested data;
   means for retrieving said requested data;
   means for formatting said requested data according to a user profile; and
   means for transmitting said data to said subscriber via a Short Message Service (SMS) message.

* * * * *